US012031602B2

(12) United States Patent
Nilsson et al.

(10) Patent No.: US 12,031,602 B2
(45) Date of Patent: Jul. 9, 2024

(54) PENDULUM WEIGHT, A CENTRIFUGAL PENDULUM ABSORBER, A FLYWHEEL ARRANGEMENT AND A METHOD OF MANUFACTURING A FLYWHEEL ARRANGEMENT

(71) Applicant: Volvo Truck Corporation, Gothenburg (SE)

(72) Inventors: Ola Nilsson, Varberg (SE); Pär Öhrfeldt, Mölnlycke (SE); Ödül Bilen, Hisings Backa (SE)

(73) Assignee: Volvo Truck Corporation, Gothenburg (SE)

( * ) Notice: Subject to any disclaimer, the term of this patent is extended or adjusted under 35 U.S.C. 154(b) by 109 days.

(21) Appl. No.: 17/606,039

(22) PCT Filed: Apr. 25, 2019

(86) PCT No.: PCT/EP2019/060652
§ 371 (c)(1),
(2) Date: Oct. 24, 2021

(87) PCT Pub. No.: WO2020/216447
PCT Pub. Date: Oct. 29, 2020

(65) Prior Publication Data
US 2022/0205512 A1 Jun. 30, 2022

(51) Int. Cl.
*F16F 15/14* (2006.01)
(52) U.S. Cl.
CPC ........ *F16F 15/145* (2013.01); *F16F 2222/08* (2013.01); *F16F 2226/04* (2013.01); *F16F 2232/02* (2013.01); *F16F 2236/08* (2013.01)
(58) Field of Classification Search
None
See application file for complete search history.

(56) References Cited

U.S. PATENT DOCUMENTS 9,939,043 B2 * 4/2018 Verhoog ................. F16F 15/31
10,047,844 B2   8/2018 Tomiyama

FOREIGN PATENT DOCUMENTS

| CN | 104302946 A | 1/2015 |
|---|---|---|
| CN | 105637255 A | 6/2016 |

(Continued)

OTHER PUBLICATIONS

International Search Report and Written Opinion of the International Searching Authority, PCT/EP2019/060652, mailed Jan. 10, 2020, 13 pages.

(Continued)

*Primary Examiner* — Vicky A Johnson
(74) *Attorney, Agent, or Firm* — Sage Patent Group

(57) ABSTRACT

A pendulum weight for a centrifugal pendulum absorber for a flywheel of a vehicle includes a bearing surface that, when the pendulum weight is mounted radially outside of a central axis of the pendulum absorber, cooperates with a corresponding bearing surface provided on a separate part of the pendulum absorber, with respect to which separate part the pendulum weight is thereby configured to be movable along a predetermined pendulum path. The pendulum weight further includes a pocket formed in connection with the bearing surface, the pocket being configured to receive at least a portion of the separate part when the pendulum weight moves along the pendulum path. The pendulum weight includes an outward portion and a separate inward portion which are assemblable to form the pendulum weight, the outward portion being configured to be located radially outside of the inward portion with respect to the central axis when mounted.

12 Claims, 6 Drawing Sheets

(56) References Cited

FOREIGN PATENT DOCUMENTS

| | | | | |
|---|---|---|---|---|
| CN | 106795944 | A | 5/2017 | |
| DE | 102009042812 | A1 * | 5/2010 | ............ F16F 15/145 |
| DE | 102009042812 | A1 | 5/2010 | |
| DE | 102012223963 | A1 | 6/2014 | |
| DE | 112014000987 | T5 | 11/2015 | |
| EP | 2687749 | A1 | 1/2014 | |
| FR | 2989753 | A1 | 10/2013 | |
| FR | 3037371 | A1 | 12/2016 | |
| JP | 2019049347 | A | 3/2019 | |
| WO | 2016001500 | A1 | 1/2016 | |
| WO | 2017122812 | A1 | 7/2017 | |

OTHER PUBLICATIONS

International Preliminary Report on Patentability of the International Preliminary Examining Authority, PCT/EP2019/060652, mailed Jul. 23, 2021, 16 pages.
First Chinese Office Action for Chinese Patent Application No. CN 201980095712.7 mailed on Sep. 15, 2023, 9 pages (including English translation).

* cited by examiner

PENDULUM WEIGHT, A CENTRIFUGAL PENDULUM ABSORBER, A FLYWHEEL ARRANGEMENT AND A METHOD OF MANUFACTURING A FLYWHEEL ARRANGEMENT

CROSS REFERENCE TO RELATED APPLICATIONS

This application is a 35 U.S.C. § 371 national stage application of PCT International Application No. PCT/EP2019/060652 filed on Apr. 25, 2019, the disclosure and content of which is incorporated by reference herein in its entirety.

TECHNICAL FIELD

The invention relates to a pendulum weight for a centrifugal pendulum absorber, a centrifugal pendulum absorber, a flywheel arrangement for an engine, and a method of manufacturing such a flywheel arrangement. The invention also relates to a vehicle comprising such a flywheel arrangement.

The invention can be applied in vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

It is known to connect a flywheel to a crankshaft of an internal combustion engine for a vehicle. The flywheel is used for evening out the uneven power output from the engine, which is caused by uneven power output from each cylinder of the engine during the cylinder's combustion cycle.

It is further known to connect a centrifugal pendulum absorber to the flywheel for reducing vibrations from the crankshaft. Vibrations are common for most engines, but have been found to be more common for more fuel efficient engines. By the trend of reducing fuel consumption, vibrations have become a more common issue in modern vehicles. Centrifugal pendulum absorbers for flywheels include a number of pendulum weights arranged circumferentially around a center axis of the flywheel, which pendulum weights are movable with respect to the flywheel, thereby dampening vibrations.

An example of a centrifugal pendulum device is disclosed in DE102016205765 A1. It discloses a centrifugal pendulum device which comprises one or more pendulum weights which can perform pendulum motions relative to a carrier disc. It further comprises a buffer ring which is arranged between the rotation axis and the pendulum weights, wherein the ring can perform a frictional sliding movement relative to the carrier disk by the pendulum motions.

To achieve an efficient vibration damping, it is desirable that the pendulum weights are relatively heavy. At the same time, the available space in which the pendulum weights are to be mounted may be rather narrow.

SUMMARY

A primary object of the invention is to provide a pendulum weight for mounting in a centrifugal pendulum absorber for a flywheel and to provide a centrifugal pendulum absorber and a flywheel arrangement for an engine, such as an internal combustion engine, which pendulum weight, centrifugal pendulum absorber and flywheel arrangement are alternatives to and/or are in at least some aspect improved in comparison with prior art solutions. In particular, it is an object to provide a pendulum weight which may be easily mounted in a flywheel arrangement in which the available space is narrow. Another object is to provide an in at least some aspect improved method of manufacturing such a flywheel arrangement.

At least the primary object is achieved by a pendulum weight for mounting in a centrifugal pendulum absorber according to claim 1. The pendulum weight comprises:

at least one bearing surface configured to, when the pendulum weight is mounted radially outside of a central axis of the centrifugal pendulum absorber, cooperate with at least one corresponding bearing surface provided on a separate part of the centrifugal pendulum absorber, with respect to which separate part the pendulum weight is thereby configured to be movable along a predetermined pendulum path, at least one pocket formed in connection with the at least one bearing surface, the pocket being configured to receive at least a portion of the separate part of the centrifugal pendulum absorber when the pendulum weight moves along the predetermined pendulum path, wherein the pendulum weight comprises an outward portion and a separate inward portion which are assemblable to form the pendulum weight, the outward portion being configured to be located radially outside of the inward portion with respect to the central axis when mounted in the centrifugal pendulum absorber, wherein the at least one bearing surface and the at least one pocket are both provided on one of said inward and outward portions.

The proposed pendulum weight thus comprises two separate portions which are assemblable upon mounting the pendulum weight in the centrifugal pendulum absorber, such that a solid pendulum weight is provided when the two portions are assembled in place, i.e. in an available space of the centrifugal pendulum absorber or of a flywheel arrangement. The portion that comprises the pocket(s) that is (are) to overlap with the separate part of the centrifugal pendulum absorber may be mounted first and positioned such that the at least one pocket receives the portion(s) of the separate part. After positioning this portion of the pendulum weight, the other portion of the pendulum weight may be pushed into engagement with the positioned portion, thereby assembling the pendulum weight.

In this way, the available space within the flywheel arrangement may be efficiently used, since it is possible to mount a pendulum weight which is larger than would be possible if using a pendulum weight formed in one piece. A volume, and thereby also a mass of the pendulum weight, may thus be maximized.

According to one embodiment, the at least one bearing surface and the at least one pocket are provided on the outward portion. The bearing surface(s) is (are) thus positioned radially outside of a center of mass of the pendulum weight. This enables the use of a lubricant, which during use of the flywheel arrangement will be thrown outwards, keeping the bearing surfaces lubricated. Friction between the components of the centrifugal pendulum absorber is thereby reduced and the durability is improved.

According to one embodiment, the inward portion and the outward portion are assemblable by pressing said portions together in a pressing direction parallel with the central axis, i.e. the central axis of the centrifugal pendulum absorber. This facilitates mounting and ensures an efficient use of the available space within the centrifugal pendulum absorber.

According to one embodiment, the pendulum weight, as seen in a section perpendicular to the central axis, has a basic shape of an annulus sector, the outward portion of the pendulum weight being located radially outside of the inward portion with respect to a central axis of the annulus sector. The annulus sector in this case has a central axis that coincides with the central axis of the centrifugal pendulum absorber. This configuration is beneficial for an efficient vibration damping since it results in a relatively large volume and mass of the pendulum weight.

By "a basic shape of an annulus sector" is to be understood that, in the section perpendicular to the central axis, radially inward and outward peripheral surfaces of the pendulum weight form arcs of concentric circles. However, recesses may be provided in said surfaces, corners may be rounded, etc.

According to one embodiment, the at least one bearing surface comprises two angularly spaced bearing surfaces. The pendulum weight may be mirror symmetric with respect to a plane including the center axis, said plane extending halfway between the two angularly spaced bearing surfaces. Such a pendulum weight is also referred to as a bifilar pendulum weight. With a rolling element such as a roller positioned between each of the bearing surfaces and the corresponding bearing surfaces on the separate part of the centrifugal pendulum absorber, a predetermined pendulum path in the form of a tautochrone curve may be realized. This is beneficial for efficient vibration damping.

According to one embodiment, the pendulum weight further comprises at least one recess formed in a peripheral surface of the pendulum weight, wherein each recess comprises one of the at least one bearing surface. The bearing surfaces are thus in this embodiment formed on a peripheral surface and not on an inner surface of the pendulum weight.

According to one embodiment, at least one of the outward portion and the inward portion comprises a male engagement member and the other one of the outward portion and the inward portion comprises a female engagement member, the male engagement member being configured to be brought into engagement with the female engagement member to assemble the portions, whereby relative movement of the portions in at least a radial direction and a tangential direction of the centrifugal pendulum absorber is prevented. This ensures a predictable kinematic behaviour of the pendulum weight during use in a centrifugal pendulum absorber. Of course, more than one male and female engagement members may be provided.

According to a second aspect of the invention, at least the primary object is achieved by a centrifugal pendulum absorber for a flywheel, the centrifugal pendulum absorber comprising:
- at least one of the proposed pendulum weight,
- a ring member constituting said separate part of the centrifugal pendulum absorber.

Preferably, the centrifugal pendulum absorber comprises a plurality of pendulum weights arranged circumferentially around the center axis of the centrifugal pendulum absorber. For example, the number of pendulum weights may be 3-7 pendulum weights, such as five (5) pendulum weights.

The predetermined pendulum path herein lies within a plane perpendicular to the center axis. The predetermined pendulum path may be a tautochrone curve.

The bearing surface and the corresponding bearing surface are, during use of the centrifugal pendulum absorber, configured to be movable with respect to each other, i.e. the bearing surfaces can be understood as raceways.

The ring member may be made of a steel alloy, such as bearing steel.

Advantages and effects provided by the centrifugal pendulum absorber are largely analogous to the advantages and effects provided by the first aspect of the invention. It shall also be noted that each embodiment of the first aspect of the invention is applicable with each embodiment of the second aspect of the invention and vice versa.

According to one embodiment, the ring member is provided radially outside of the at least one pendulum weight. In this embodiment, the bearing surface(s) of the pendulum weight is (are) provided on an outer peripheral surface of the pendulum weight. As mentioned above, the bearing surface(s) is (are) thus positioned radially outside of the center of mass of the pendulum weight, enabling the use of a lubricant to reduce friction between the components.

According to one embodiment, the ring member comprises an annular main portion and at least one protrusion extending radially from the annular main portion, wherein each of the at least one corresponding bearing surface is formed on one of the at least one protrusion, wherein the at least one pocket of the at least one pendulum weight is configured to receive at least a portion of the at least one protrusion when the pendulum weight moves along the predetermined pendulum path.

According to one embodiment, the centrifugal pendulum absorber further comprises at least one rolling element, such as a roller, positioned between and configured to cooperate with the at least one bearing surface of the at least one pendulum weight and the at least one corresponding bearing surface of the ring member to provide the predetermined pendulum path. Thus, in this embodiment, the bearing surfaces together with the rolling element define the pendulum path. The rolling element contributes to reduced friction and is also useful for achieving a pendulum path in the form of a tautochrone curve. In this embodiment, the bearing surfaces may be concave surfaces facing one another.

According to one embodiment, the centrifugal pendulum absorber further comprises at least one stopping element positioned such that it defines an end point of the predetermined pendulum path, at which end point the at least one pendulum weight is configured to come into contact with the at least one stopping element, wherein the at least one stopping element is located radially inwardly with respect to the at least one pendulum weight. The stopping element prevents the pendulum weight from bumping into the ring member during use. The stopping element may be made as a separate part which is easier to replace than the ring member, thereby improving the lifetime of the flywheel arrangement.

The stopping element may preferably be made of a ductile material, such as a copper alloy, for example brass or bronze, whereby noise is reduced.

According to a third aspect of the invention, at least the primary object is achieved by a flywheel arrangement for an engine, comprising:
- a flywheel configured to be connected to a crankshaft of the engine for common rotation about a central axis,
- the proposed centrifugal pendulum absorber, wherein the ring member is configured for common rotation with the flywheel.

The pendulum weight(s) may herein be arranged directly in contact with a side face of the flywheel. The flywheel may be made of cast iron, such as grey cast iron, and the ring member may be press-fitted to the flywheel. The ring member may additionally be attached to the flywheel using key joints extending in the radial direction.

Advantages and effects provided by the flywheel arrangement are largely analogous to the advantages and effects provided by the second aspect of the invention.

According to one embodiment, the flywheel arrangement further comprises a cover plate provided on a side face of the flywheel, which cover plate sealingly covers the pendulum weights. The cover plate protects the centrifugal pendulum absorber from clutch dust and it also enables forming one or more closed compartment(s), further delimited by a side face of the flywheel, the ring member, and if applicable the stopping element(s), in which closed compartment(s) the pendulum weight(s) is (are) arranged. This is particularly beneficial when a lubricant, such as grease, is used to lubricate the centrifugal pendulum absorber.

According to a fourth aspect of the invention, the invention relates to a vehicle comprising the proposed centrifugal pendulum absorber or the proposed flywheel arrangement. The vehicle may be a heavy-duty vehicle, such as a bus or a truck, but it may also be another type of vehicle.

Advantages and effects provided by the vehicle are largely analogous to the advantages and effects provided by the other aspects of the invention.

According to a fifth aspect of the invention, at least one of the above defined objects is achieved by a method of manufacturing the proposed flywheel arrangement according to the independent method claim. The method comprises:
  providing a flywheel configured to receive the at least one pendulum weight and the ring member,
  attaching the ring member to the flywheel,
  mounting the one of said inward and outward portions of the at least one pendulum weight that comprises the at least one bearing surface and the at least one pocket, such that the at least one pocket receives at least a portion of the ring member mounted to the flywheel,
  subsequently to mounting said portion that comprises the at least one bearing surface and the at least one pocket, mounting the other one of said inward and outward portions of the at least one pendulum weight, thereby assembling the at least one pendulum weight.

The portion that is to overlap with the separate part of the centrifugal pendulum absorber is thus mounted first and positioned such that it receives the portion(s) of the ring member. After positioning this portion of the pendulum weight, the other portion is pushed into engagement with the positioned portion, preferably by pushing in the axial direction, thereby assembling the pendulum weight. The portions of the pendulum weight are thus press-fitted in place. The proposed method provides a way of efficiently using an available space within the flywheel arrangement as further discussed above.

According to one embodiment, the method further comprises machining the ring member to form the corresponding bearing surfaces subsequently to attaching the ring member to the flywheel and prior to mounting the at least one pendulum weight. It is thereby avoided that the bearing surfaces of the ring member are deformed upon attaching the ring member to the flywheel, e.g. using press-fitting. Thus, a better shape accuracy is achieved, leading to a better control of the predetermined pendulum path and thereby of the kinematic properties of the flywheel arrangement.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
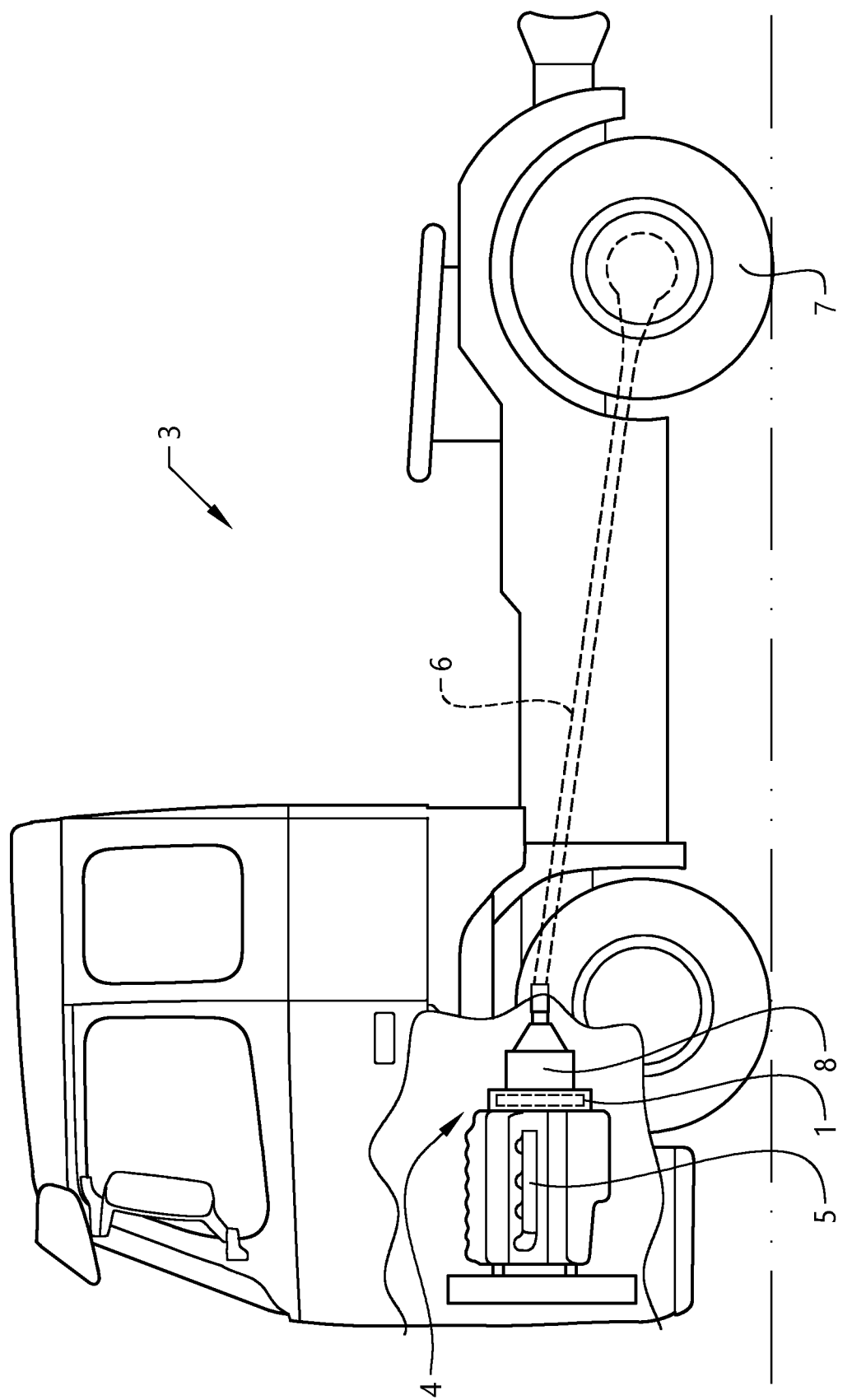
FIG. 1 schematically shows a vehicle according to an embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 schematically shows a vehicle 3 according to an embodiment of the invention. The vehicle 3 includes a powertrain 4 with an engine 5 connected to a crankshaft (not shown), to which a flywheel arrangement 1 is connected for common rotation. A drive shaft 6 connects the engine 5 to driving wheels 7 of the vehicle 3 via a transmission 8 connected to the flywheel via a clutch (not shown).

Figure 2:
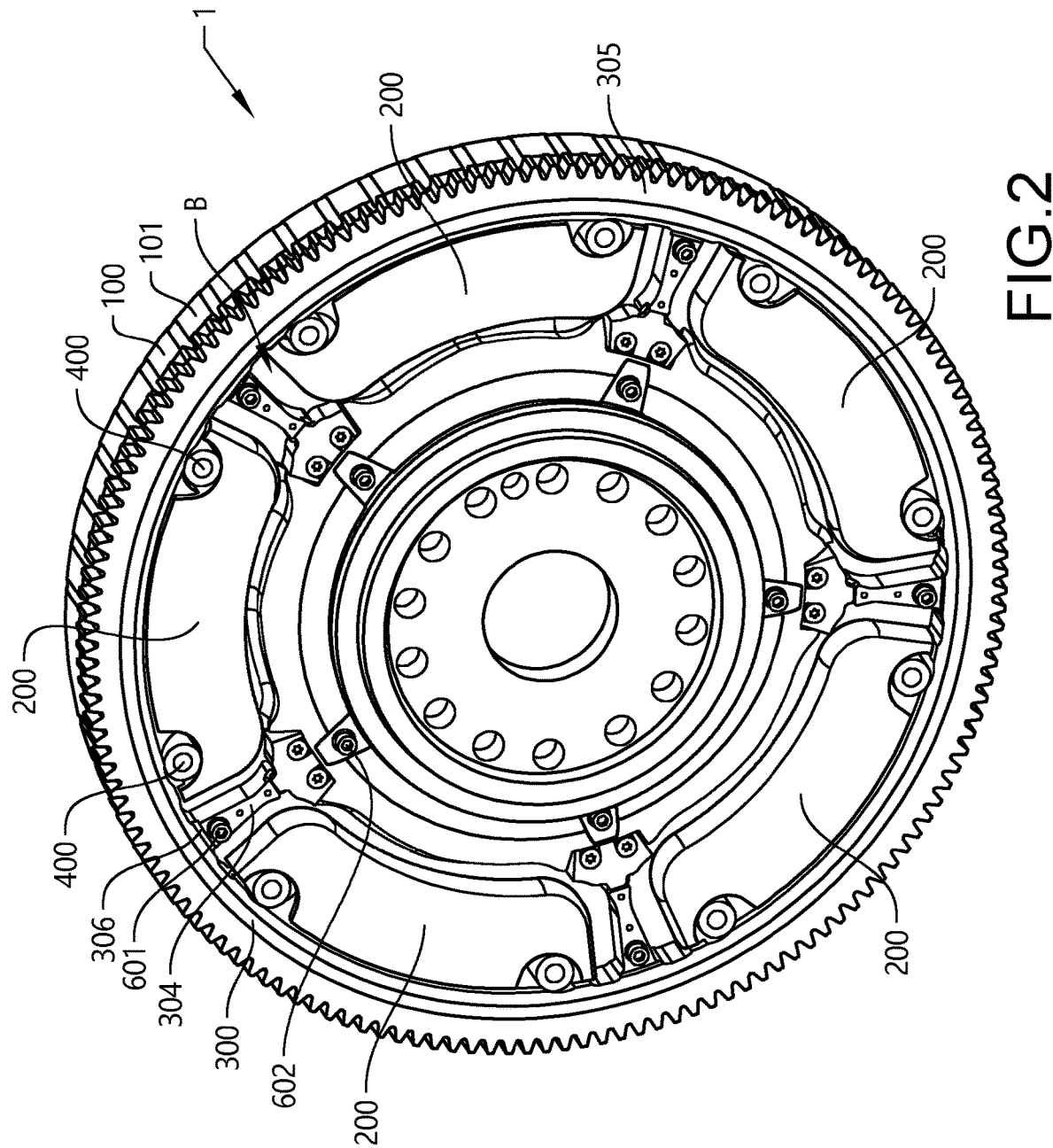
FIG. 2 is a perspective view of a flywheel according to an embodiment of the invention.
Figure 3:
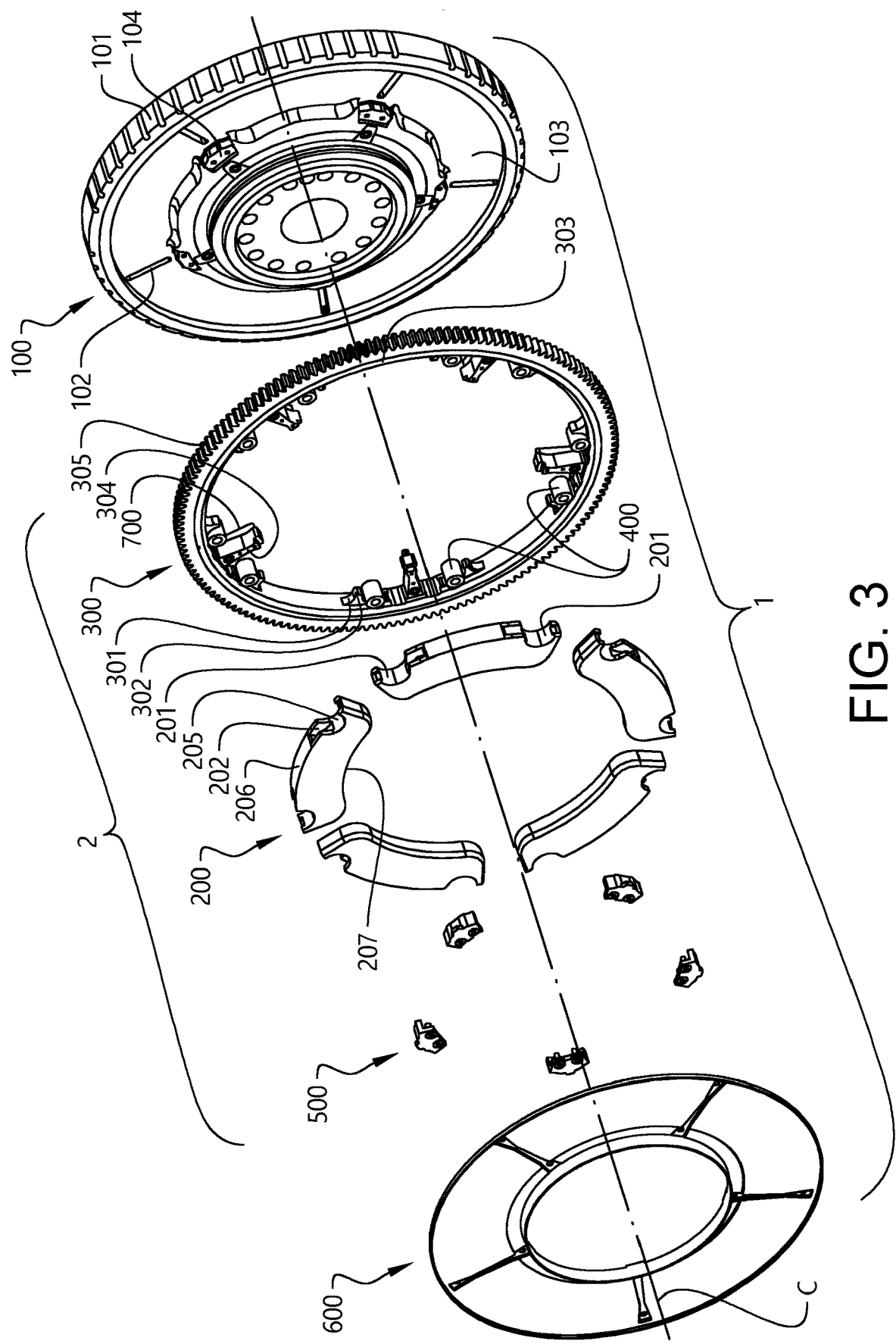
FIG. 3 is an exploded view of the flywheel arrangement in FIG. 2.
Figure 4:
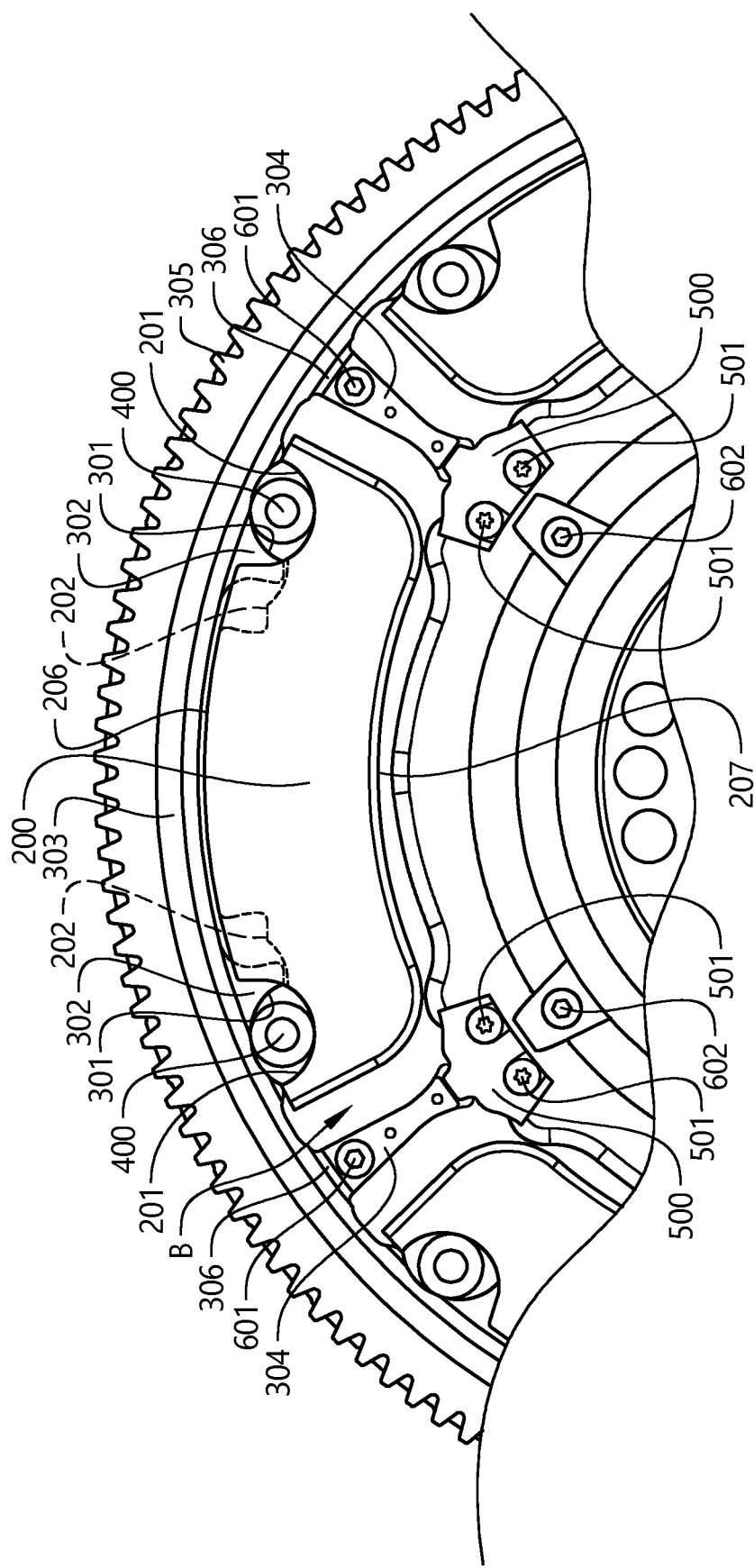
FIG. 4 is a planar view showing a portion of the flywheel arrangement in FIG. 2.

A flywheel arrangement 1 according to an embodiment of the invention is schematically shown in closer detail in FIG. 2. Reference is also made to FIG. 3, in which the flywheel arrangement 1 is shown in an exploded view, and to FIG. 4, showing a portion of the flywheel arrangement 1 in closer detail. The flywheel arrangement 1 includes a flywheel 100 configured to be connected to the crankshaft of the powertrain 4 for common rotation about a center axis C. A centrifugal pendulum absorber 2 is provided, comprising a plurality of pendulum weights 200, in the shown embodiment five pendulum weights 200, which are circumferentially arranged between the center axis C and a radially peripheral surface 101 of the flywheel 100, facing a side face 103 of the flywheel 100. Radially outside of the pendulum weights 200, a ring member 300 is arranged, connected for common rotation with the flywheel 100 around the center axis C.

Each pendulum weight 200 comprises two concavely curved inner bearing surfaces 201 facing the ring member 300. The ring member 300 in turn, for each pendulum weight 200, comprises two concavely curved corresponding outer bearing surfaces 301, each outer bearing surface 301 facing one of the inner bearing surfaces 201. Thus, an outer bearing surface 301 and an inner bearing surface 201 together form a pair of cooperating bearing surfaces 201, 301. Between each pair of cooperating bearing surfaces 201, 301, a rolling element 400 in the form of a roller is positioned, configured to be in rolling contact with the bearing surfaces 201, 301. The pendulum weight 200 is thereby movable with respect to the flywheel 100 along a predetermined pendulum path, herein a tautochrone curve, which predetermined pendulum path is defined by the two pairs of cooperating bearing surfaces 201, 301 and the rolling elements 400.

Figure 5:
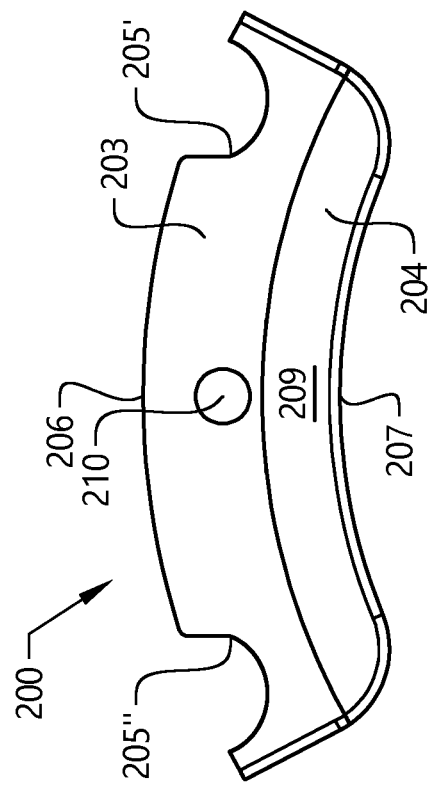
FIG. 5 is a front end planar view of a pendulum weight according to an embodiment of the invention.
Figure 6:
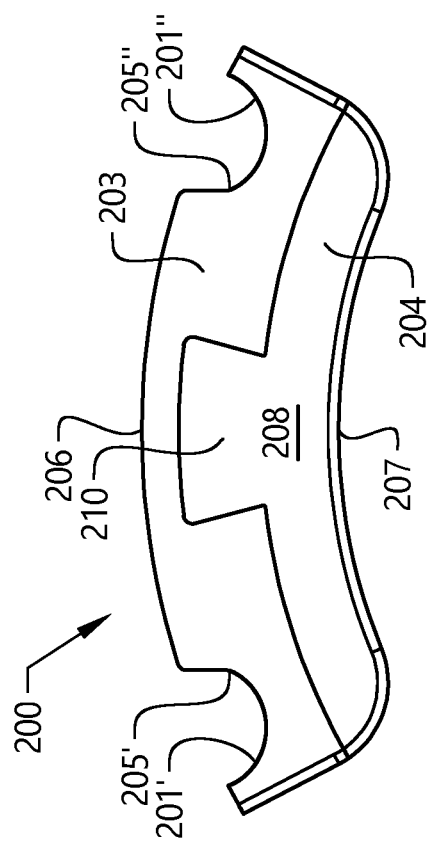
FIG. 6 is a rear end planar view of the pendulum weight in FIG. 5.
Figure 7:
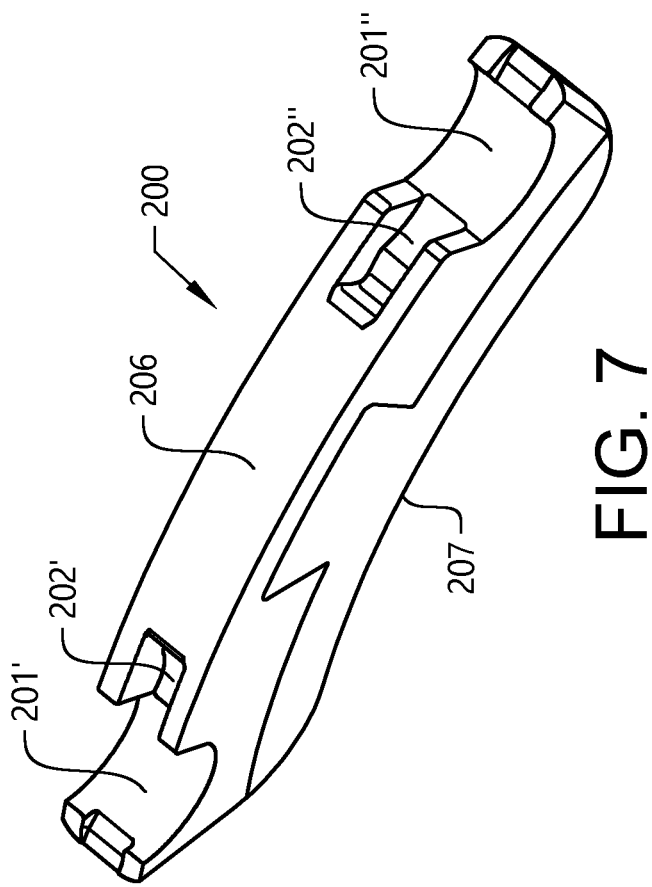
FIG. 7 is a perspective view of the pendulum weight in FIG. 5.

A pendulum weight 200 according to an embodiment of the invention is shown in further detail in FIGS. 5-7, wherein FIG. 5 shows the pendulum weight in a front end view, FIG. 6 shows the pendulum weight in a rear end view, and FIG. 7 shows the pendulum weight in perspective view. A front side 208 of the pendulum weight is herein configured to face away from the side face 103 of the flywheel 100, and a rear side 209 is configured to face the side face 103 of the flywheel 100. The pendulum weight 200 comprises an outward portion 203 and a separate inward portion 204, which portions 203, 204 are assemblable to form the pendulum weight 200. Of course, the pendulum weights 200 shown in FIGS. 2-4 also comprise an outward portion and a separate inward portion, although details relating to this have been omitted in these figures.

The outward portion 203 is configured to be located radially outside of the inward portion 204 with respect to the central axis C of the centrifugal pendulum absorber 2, when mounted therein. The pendulum weight 200 has a basic shape of an annulus sector as seen in a plane (or section) perpendicular to a central axis of the annulus sector, coinciding with the central axis C of the centrifugal pendulum absorber 2 when mounted. Thus, an outer peripheral surface 206 of the pendulum weight 200, facing the ring member 300, is a convex surface with a first radius of curvature, and an inner peripheral surface 207 of the pendulum weight 200, opposite to the outer peripheral surface 206, is a concave surface with a second radius of curvature, which is smaller than the first radius of curvature. The outer peripheral surface 206 is located on the outward portion 203, while the inner peripheral surface 207 is located on the inward portion 204. Rounded transitions are provided between the inner peripheral surface 207 and radially extending side surfaces of the pendulum weight 200.

Two recesses 205', 205" are formed in the outer peripheral surface 206 of the pendulum weight 200. The pendulum weight 200 is mirror symmetric with respect to a mirror plane (not shown) including the central axis C and being located halfway between the two recesses 205', 205".

The pendulum weight 200 herein comprises two angularly spaced bearing surfaces 201', 201" formed in the respective recesses 205', 205" and two pockets 202', 202" formed in the outer peripheral surface 206 in connection with each of the bearing surfaces 201', 201". The two bearing surfaces 201', 201" and the two pockets 202', 202" are all provided on the outward portion 203 of the pendulum weight 200.

The inward portion 204 and the outward portion 203 are assemblable by pressing the portions 203, 204 together in a pressing direction parallel with the central axis C, whereby a solid member constituting the pendulum weight 200 is formed. For this purpose, the inward portion 204 is in the shown embodiment provided with a male engagement member 210 configured to engage with a corresponding female engagement member of the outward portion 203. After assembly, relative movement of the outward portion 203 with respect to the inward portion 204 about the center axis C and in the radial direction is efficiently prevented.

The pockets 202', 202" are hidden when the pendulum weight is seen in a planar view, such as in FIGS. 5 and 6. As shown in FIGS. 2-4, the ring member 300 comprises an annular main portion 303 and a plurality of protrusions 302 extending radially inwards from the annular main portion. Each outer bearing surface 301 is formed at least partly on such a protrusion 302. Each pocket 202 of the pendulum weight is configured to receive a portion of one of the protrusions 302 during use of the flywheel arrangement 1, when the pendulum weight 200 moves along the predetermined pendulum path during use of the flywheel arrangement.

The ring member 300 further comprises a plurality of radially extending connection portions 304, extending radially inwards from the annular main portion 303. Each radially extending connection portion 304 is arranged between two neighbouring pendulum weights 200.

A plurality of key members 700 are further provided, by means of which the ring member is secured to the flywheel. Each key member is fitted into radially extending keyseats 102 provided in the flywheel 100. The key members 700 and the ring member 300 may be formed as separate pieces, wherein the key members 700 are attached to the ring member 300 after having been fitted in the keyseats 102, but they may also be formed in one piece. The key members 700 and the ring member 300 may be made of the same material.

The flywheel arrangement 1 further comprises a plurality of stopping elements 500, each stopping element 500 being located radially inwardly with respect to the at least one pendulum weight 200. Each stopping element 500 abuts a radially inner portion of the connection portion 304 and is attached to a seat 104 of the flywheel 100. It is positioned such that it defines end points of the predetermined pendulum paths of two neighbouring pendulum weights 200, at which end points the pendulum weights 200 are configured to come into contact with the stopping element 500. The stopping elements are fastened using screws 501.

The flywheel arrangement 1 further comprises a cover plate 600 mounted to the ring member 300 and to the side face 103 of the flywheel using screws 601,602, which cover plate 600 sealingly covers the pendulum weights 200 such that a plurality of closed compartments B are formed, each pendulum weight 200 being located in one of the closed compartments B. Extending between each two neighbouring closed compartments B, a channel for fluid 306 may be provided, fluidly connecting the two compartments such that lubricant may flow between the closed compartments during use of the flywheel arrangement 1. It is to be noted that the cover plate 600 has been removed in FIGS. 2 and 4.

The ring member 300 further comprises a ring gear 305, which may be a separate part or which may be formed integrally with the ring member 300.

Figure 8:
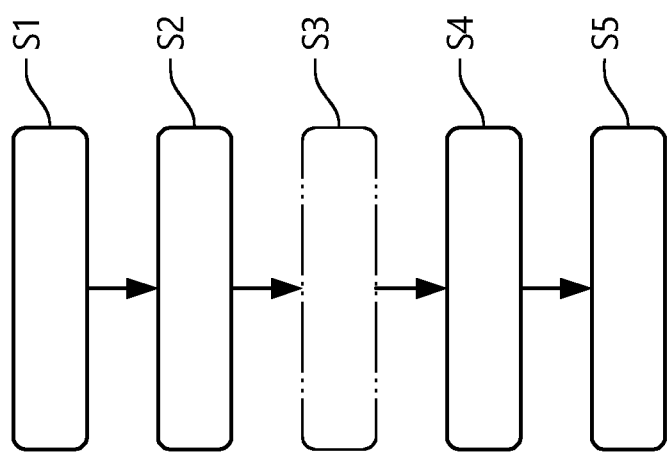
FIG. 8 is a flow chart schematically illustrating a method according to an embodiment of the invention.

FIG. 8 schematically shows a method of manufacturing a flywheel arrangement 1 according to an embodiment of the invention. Optional steps are marked with dashed lines.

In a first step S1, a flywheel 100 configured to receive the pendulum weights 200 and the ring member 300 is provided. In a second step S2, the ring member 300 is attached to the flywheel 100. The ring member 300 may be provided with the corresponding bearing surfaces 301 already when mounted to the flywheel 100, but it may for some configurations be advantageous to mount the ring member in the form of a ring member blank, in which case a third step S3 of machining the ring member 300 to form the corresponding bearing surfaces 301 may be carried out subsequently to attaching the ring member 300 to the flywheel 100.

In a fourth step S4, the one of the inward and outward portions 303, 304 of the at least one pendulum weight 200 that comprises the at least one bearing surface 201 and the at least one pocket 202 is mounted, such that the at least one pocket 202 receives at least a portion of the ring member 300 mounted to the flywheel 100. In the shown embodiment, the outward portion 203 needs to be mounted first. The outward portion 203 is mounted such that each of the pockets 202 receives a portion of the protrusion 302 of the ring member 300, i.e. such that the received portion of the protrusion 302 is hidden behind the front side 208 of the pendulum weight when seen in a front end planar view such as in FIG. 4.

In a fifth step S5, carried out subsequently to the step S4, the other one of said inward and outward portions 203, 204 of the at least one pendulum weight 200 is mounted, thereby assembling the at least one pendulum weight 200. In the shown embodiment, this step is carried out by pressing the inward portion 204 of the pendulum weight in an axial direction, i.e. parallel with the center axis C, onto the outward portion 203, with the male engagement portion 210 engaging with the female engagement portion.

Rolling elements 400 may if applicable be mounted between the bearing surfaces 201, 301. The method may further comprise steps of attaching stopping members 500 and a cover plate 600 (not shown).

It is to be understood that the present invention is not limited to the embodiments described above and illustrated in the drawings; rather, the skilled person will recognize that many changes and modifications may be made within the scope of the appended claims.

The invention claimed is:

1. A centrifugal pendulum absorber for a flywheel comprising:
   at least one pendulum weight; and
   a ring member constituting a separate part of the centrifugal pendulum absorber, wherein the ring member is provided radially outside of the at least one pendulum weight,
   wherein the at least one pendulum weight comprises:
      at least one bearing surface configured to, when the at least one pendulum weight is mounted radially outside of a central axis of the centrifugal pendulum absorber, cooperate with at least one corresponding bearing surface provided on the separate part of the centrifugal pendulum absorber, with respect to which separate part the at least one pendulum weight is thereby configured to be movable along a predetermined pendulum path;
      at least one pocket formed in connection with the at least one bearing surface, the pocket being configured to receive at least a portion of the separate part of the centrifugal pendulum absorber when the at least one pendulum weight moves along the predetermined pendulum path;
      an outward portion and a separate inward portion which are assemblable to form the at least one pendulum weight, the outward portion being configured to be located radially outside of the inward portion with respect to the central axis when mounted in the centrifugal pendulum absorber, wherein the at least one bearing surface and the at least one pocket are both provided on one of said inward and outward portions,
   wherein at least one of the outward portion and the inward portion comprises a male engagement member and the other one of the outward portion and the inward portion comprises a female engagement member, the male engagement member being configured to be brought into engagement with the female engagement member to assemble the portions by pressing said portions together in a pressing direction parallel with the central axis, whereby relative movement of the portions in at least a radial direction and a tangential direction of the centrifugal pendulum absorber is prevented.

2. The centrifugal pendulum absorber according to claim 1, wherein the at least one bearing surface and the at least one pocket are provided on the outward portion.

3. The centrifugal pendulum absorber according to claim 1, wherein the at least one pendulum weight, as seen in a section perpendicular to the central axis, has a basic shape of an annulus sector, the outward portion of the at least one pendulum weight being located radially outside of the inward portion with respect to a central axis of the annulus sector.

4. The centrifugal pendulum absorber according to claim 1, wherein the at least one bearing surface comprises two angularly spaced bearing surfaces.

5. The centrifugal pendulum absorber according to claim 1, wherein the ring member comprises an annular main portion and at least one protrusion extending radially from the annular main portion, wherein each of the at least one corresponding bearing surface is formed on one of the at least one protrusion, wherein the at least one pocket of the at least one pendulum weight is configured to receive at least a portion of the at least one protrusion when the pendulum weight moves along the predetermined pendulum path.

6. The centrifugal pendulum absorber according to claim 1 further comprising at least one rolling element positioned between and configured to cooperate with the at least one bearing surface of the at least one pendulum weight and the at least one corresponding bearing surface of the ring member to provide the predetermined pendulum path.

7. The centrifugal pendulum absorber according to claim 1 further comprising at least one stopping element positioned such that it defines an end point of the predetermined pendulum path, at which end point the at least one pendulum weight is configured to come into contact with the at least one stopping element, wherein the at least one stopping element is located radially inwardly with respect to the at least one pendulum weight.

8. A flywheel arrangement for an engine comprising:
   a flywheel configured to be connected to a crankshaft of the engine for common rotation about a central axis; and
   the centrifugal pendulum absorber according to claim 1, wherein the ring member is configured for common rotation with the flywheel.

9. A vehicle comprising the flywheel arrangement according to claim 8.

10. A vehicle comprising the centrifugal pendulum absorber according to claim 1.

11. A method of manufacturing a flywheel arrangement for an engine, the flywheel arrangement comprising a flywheel configured to be connected to a crankshaft of the engine for common rotation about a central axis, and a centrifugal pendulum absorber comprising a ring member configured for common rotation with the flywheel, and at least one pendulum weight, the pendulum weight comprising:

at least one bearing surface configured to, when the pendulum weight is mounted radially outside of a central axis of the centrifugal pendulum absorber, cooperate with at least one corresponding bearing surface provided on the ring member, with respect to which ring member the pendulum weight is thereby configured to be movable along a predetermined pendulum path, and at least one pocket formed in connection with the at least one bearing surface, the pocket being configured to receive at least a portion of the ring member when the pendulum weight moves along the predetermined pendulum path, wherein the pendulum weight comprises an outward portion and a separate inward portion which are assemblable to form the pendulum weight, the outward portion being configured to be located radially outside of the inward portion with respect to the central axis when mounted in the centrifugal pendulum absorber, wherein the at least one bearing surface and the at least one pocket are both provided on one of said inward and outward portions, the method comprising:

providing a flywheel configured to receive the at least one pendulum weight and the ring member, attaching the ring member to the flywheel, mounting the one of said inward and outward portions of the at least one pendulum weight that comprises the at least one bearing surface and the at least one pocket, such that the at least one pocket receives at least a portion of the ring member mounted to the flywheel, subsequently to mounting said portion that comprises the at least one bearing surface and the at least one pocket, mounting the other one of said inward and outward portions of the at least one pendulum weight, thereby assembling the at least one pendulum weight.

12. The method according to claim 11, further comprising machining the ring member to form the corresponding bearing surfaces subsequently to attaching the ring member to the flywheel and prior to mounting the at least one pendulum weight.

* * * * *